United States Patent [19]
Belt et al.

[11] Patent Number: 5,042,003
[45] Date of Patent: Aug. 20, 1991

[54] MEMORY USAGE SYSTEM

[75] Inventors: Steve L. Belt; Robert A. Kohtz, both of St. Joseph, Mich.

[73] Assignee: Zenith Data Systems Corporation, Buffalo Grove, Ill.

[21] Appl. No.: 215,651

[22] Filed: Jul. 6, 1988

[51] Int. Cl.[5] .............................................. G06F 12/00
[52] U.S. Cl. ................................... 364/900; 364/970.5
[58] Field of Search ... 364/200 MS File, 900 MS File

[56] References Cited

U.S. PATENT DOCUMENTS 4,346,441 8/1982 Plank et al. .......................... 364/200
4,481,570 11/1984 Wiker ................................... 364/200

Primary Examiner—Thomas M. Heckler
Attorney, Agent, or Firm—Richard A. Cederoth

[57] ABSTRACT

An improved means and method for expanded memory system access and control is disclosed. A logic array in the expanded memory control circuitry which accesses and controls up to two separate expansion boards through the use of static random access memory as register circuits and octal buffers for addressing. The control and access method implemented through a state machine in the logic array provides the operation of the improved expanded memory system to control additional expansion boards and to access the appropriate memory locations.

3 Claims, 5 Drawing Sheets

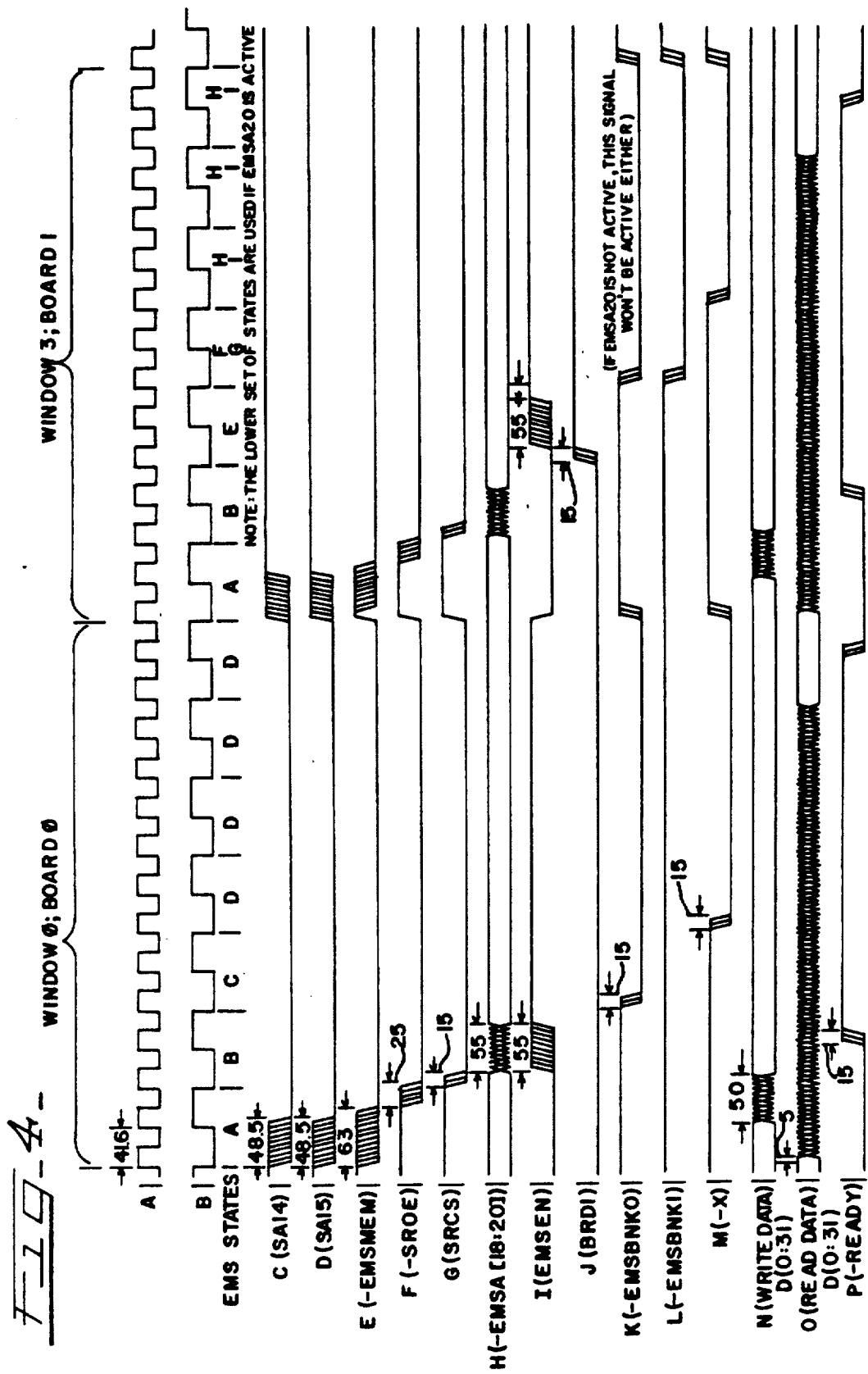

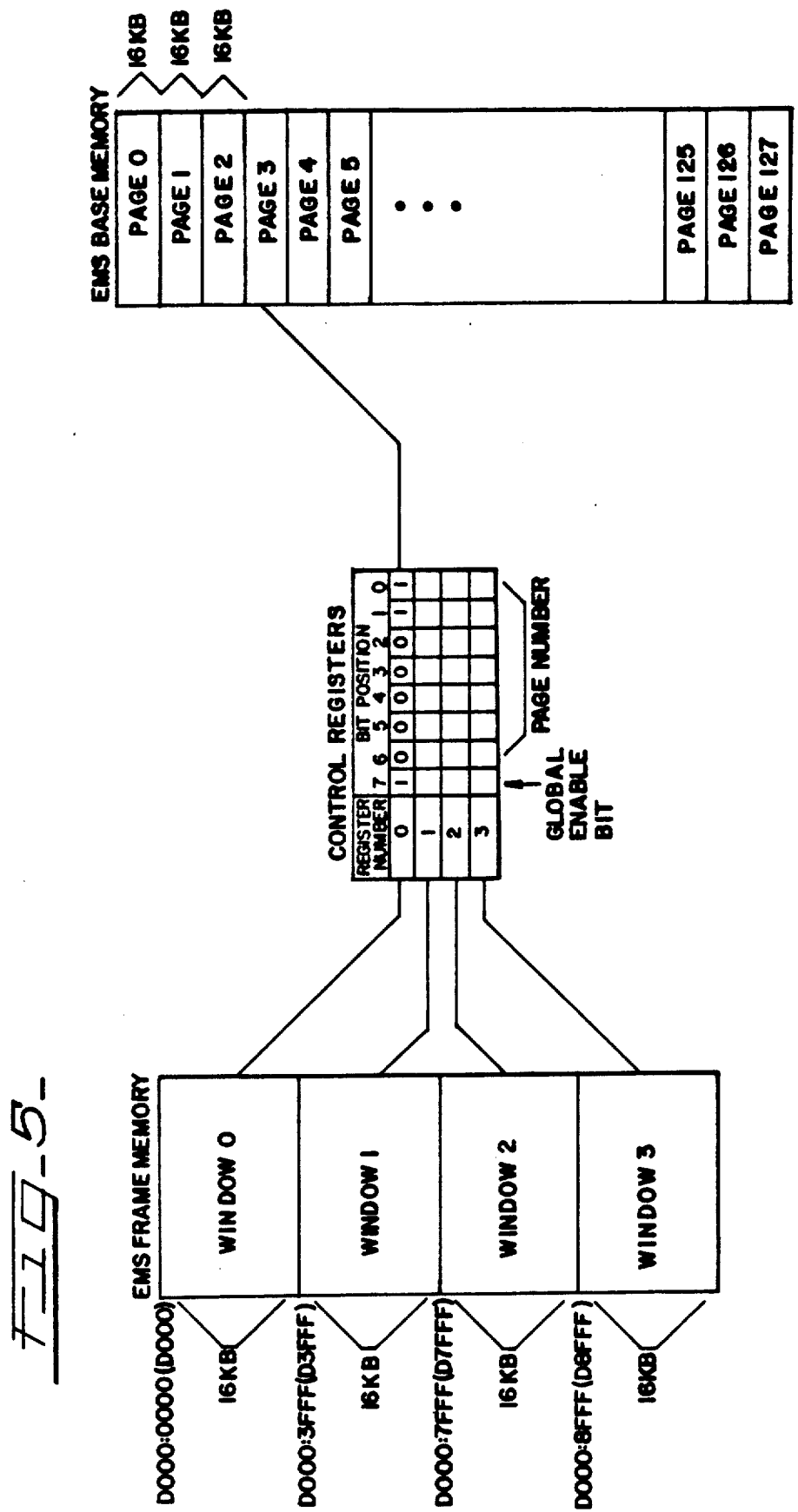

MEMORY USAGE SYSTEM

BACKGROUND OF THE INVENTION

The present invention relates generally to expanded memory systems in computer applications. More particularly, the present invention pertains to and provides a means and method for accessing page memory through memory windows that may be utilized by a central processor.

Standard linear memory (0–640K bytes) comprises a conventional memory recognized by current disc operating systems such as MS-DOS or PC-DOS. Expanded memory facility currently encompasses the use of "paged" memory consisting of add-on hardware expansion modules (typically memory and control boards) and a software driver program specific to those modules. Current, typical expanded memory schemes utilize the Expanded Memory Specification (EMS) standard which was developed through the efforts of Lotus, Intel and Microsoft Corporations (LIM). This specification uses a memory window transfer method to implement the expanded memory scheme. Further understanding of this specification may be had by reference to "Inside The IBM PC's, Lotus/Intel/Microsoft Expanded Memory", *Byte Magazine*, October, 1987 and "The Once and Future Expanded Memory Card", *Business Software Magazine*, September, 1987. Through a technique known as bank switching, a central processor can access multiple memory pages for further access in a window of predetermined addresses. A 64K byte section of conventional memory address space referred to as the frame is divided into four equal 16K byte sections referred to as memory windows. All expanded memory is transferred through the 64K byte frame. Each expanded memory board has four input/output (I/O) port addresses used to address a particular control register. Each control register is used to access up to 128 memory pages. Each control register has an eight bit control register address associated with it. A seven bit value in position zero to six (0–6) represents the address number of the page requested. Bit seven (7) is a global enable/disable bit which is used to identify (e.g., address) the specific standard memory board sought to be accessed. Each memory page is also 16KB in length. All pages on a particular board form what is known as EMS base memory.

The LIM EMS system is currently capable of expanding its hardware up to four boards, each up to 128 pages of 16 kilobytes per page, yielding a potential system total of 8 megabytes of expanded memory, controlled by four separate memory control circuits. The cost of this extended memory increases with the amount of expanded memory added. Other considerations include the addition of the hardware (boards) plus control circuitry required to support each board. Also, each additional board subtracts from the limited available space within the computer's main frame. This dollar and opportunity cost may, in some applications, represent an unsatisfactory trade-off between expanded memory and the board space needed for other computer functions.

Accordingly, it is an object of the present invention to provide an improved means and method of expanded memory in an MS-DOS, or similar, computer system.

It is yet another object of the present invention to provide an inexpensive and accurate means and method of computer memory expansion of up to four megabytes of memory without the need for additional memory expansion boards or the supporting circuitry.

It is a further object of the present invention to accomplish the task of memory expansion without decreasing the limited available space within the computer main frame.

The present invention provides a method of expanded memory for an MS-DOS compatible system, or a similar microcomputer system, while utilizing minimal additional memory control circuits. The present invention also minimizes the need for additional hardware modules, boards and the extensive circuitry required to support those boards. A preferred embodiment provides up to four megabytes of additional memory with only a slight increase in the size and cost of the control circuitry typically used to add just two megabytes to the system memory. The present invention may also be applied in a separate memory expansion board to provide more than two megabytes of expanded memory in the space now needed for just two megabytes.

BRIEF DESCRIPTION OF THE DRAWINGS

The appended claims set forth the novel features of the present invention. However, the invention, itself, as well as further and additional objects and advantages thereof, may be best understood by reference to the following detailed description of a preferred embodiment taken in conjunction with the accompanying drawings, in which like reference characters identify like elements, and of which:

FIG. 4 illustrates the timing associated with EMS memory access according to at least one embodiment of the present invention; and FIG. 5 illustrates a schematic memory map showing the desired relationship between EMS Frame memory, associated control registers and EMS base memory.

DESCRIPTION OF THE PREFERRED EMBODIMENT

Figure 1:
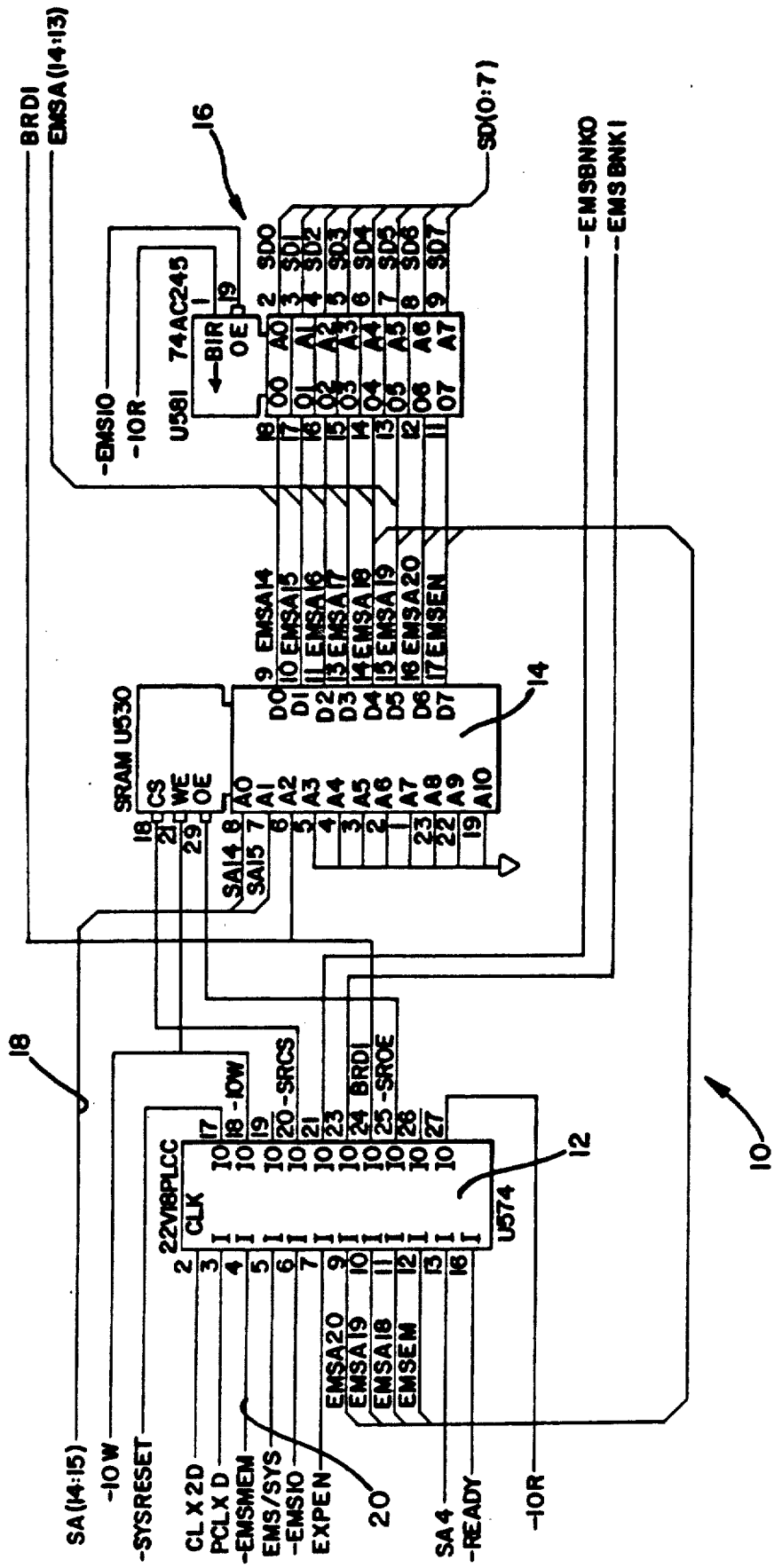
FIG. 1 comprises a block/schematic representation of extended memory control circuitry in accordance with the present invention.

Referring now to FIG. 1, therein is shown an extended memory control system 10 in accordance with the present invention. This drawing generally provides a block diagram illustration of the system of the present invention.

The extended memory control system 10 shown in FIG. 1 includes a programmable array logic (PAL) integrated circuit (IC) 12. This PAL 12 implements a logic state machine which accesses expanded memory system (EMS) registers during memory access and input/output cycles. The extended memory control system 10 shown in FIG. 1.also includes a 2×8 static random access memory (SRAM) IC 14. This IC 14 contains the EMS registers. The extended memory control system 10 also includes an octal buffer 16. The octal buffer 16 provides input/output access to the EMS registers. The extended memory control system 10 also includes various other circuitry for implementing the function of the invention as described below. The operation of the remaining circuitry would be apparent to one of ordinary skill in the computer art and familiar with standard EMS techniques. Accordingly, such description will not be repeated herein for the purposes of brevity.

It will be appreciated that the control system illustrated in FIG. 1 may be configured in a variety of ways based upon internal programming. Likewise, implementation of the present invention through the extended memory control system 10 of FIG. 1 may be best accomplished through the use of the software described hereafter. However, modifications to the software and the state machine implementation discussed herein may be done to the extent such would be apparent to one skilled in the art and familiar with the teachings of the present application. The following software description is given by way of example as currently representing the best mode of operation.

When additional memory is desired, activation of the EMS system may be accomplished through the generation of an internal signal designated "EMSMEM" on a line 20. This signal EMSMEM may be generated by an address decoder controlled by a system CPU and is received by the PAL IC 12 at a pin four in the preferred embodiment. The logic state machine implemented within the PAL IC 12 recognizes this signal to begin the EMS control function. The state machine within the PAL 12 selects one of two control register sets located within the SRAM 14. The two control register sets are designated as BRD0 and BRD1 even though no external hardware memory expansion boards exist in the preferred embodiment. These two control register sets are thus recognized by the system as BRD0 and BRD1 and respond to programming which utilizes such designations. In instances in which an expansion board may be utilized in conjunction with the present invention, that board would use either the board 2 or board 3 programming addresses as set forth in Table I below. In this fashion, the control system of FIG. 1 in accordance with the present invention may provide control of and access to up to twice as much expanded memory as current control systems allow.

Each control register set within the SRAM 14 contains four independent control registers, designated 0, 1, 2 and 3, thus providing a total of eight control registers. Each control register may be accessed as an input/output port and read or written to accordingly. The following Table I defines the input/output port address for each board and control register in a preferred embodiment.

TABLE I

| BOARD NUMBER | CONTROL REGISTER | I/O PORT ADDRESS |
| --- | --- | --- |
| 0 | 0 | 0258h (hex) |
| 0 | 1 | 4258h |
| 0 | 2 | 8258h |
| 0 | 3 | C258h |
| 1 | 0 | 0268h (hex) |
| 1 | 1 | 4268h |
| 1 | 2 | 8268h |
| 1 | 3 | C268h |
| 2 | 0 | 0208 (hex) |
| 2 | 1 | 4208 |
| 2 | 2 | 8208 |
| 2 | 3 | C208 |
| 3 | 0 | 0218 (hex) |
| 3 | 1 | 4218 |
| 3 | 2 | 8218 |
| 3 | 3 | C218 |

Each control register listed in Table I, through the software initialization and control described below, corresponds directly to a 16K byte section identified as a memory window in the 64K byte frame memory reserved for the EMS function. Each control register also is accessed by address lines A14 and A15 shown as a bus 18 in Figure 1. This is true for each of the two sets of control registers identified as BRD0 and BRD1. Because of their physical connections and location, relative to the central processing unit (CPU), these predetermined address lines segment the reserved 64K byte frame memory into four 16K byte memory windows which can be accessed by a control register. Because of the location of the reserved 64K byte frame memory within the CPU's programmed memory queue, the 16K byte memory window can only be accessed with the proper address. Each memory window is assigned an established address range with respect to its input/output port and can only be accessed by a control register having an appropriate address. The relationship of address range to control register to address lines A14 and A15 is given by the following Table II.

TABLE II

| A15 | A14 | Address Range In Frame | Control Register |
| --- | --- | --- | --- |
| 0 | 0 | 0000-3FFF | 0 |
| 0 | 1 | 4000-7FFF | 1 |
| 1 | 0 | 8000-BFFF | 2 |
| 1 | 1 | C000-FFFF | 3 |

Each control register has an eight bit address for accessing page memory in the reserved EMS base memory. The first seven bits, bit positions 0-6, represent the address of the page memory in the EMS base memory. The eighth bit represents a global enable bit.

The most significant bit of each (or both) control register is known as the global enable bit. If this bit is set, and a memory access occurs to the corresponding system memory window for that register, then the page number in that register is used to address memory in the EMS base memory for that board.

For example, assume that BRD0 control register 0 has the value:

| Bit 7 6 5 4 3 2 1 0 |
| --- |
| 0 0 0 1 1 0 0 0 | and BRD1 control register 0 has the value:

| Bit 7 6 5 4 3 2 1 0 |
| --- |
| 1 0 1 1 0 1 0 1 | then a memory access occurs to system memory address D0100h. Recall that control register 0 is checked whenever a memory access falls in the window from 0000h to 3FFF (or the first 16KB of the frame memory). Therefore, this memory access would cause register 0 of BRD0 to be checked, and since the global enable bit (bit 7) is not set, the access cannot be to board 0. Control register 0 of BRD1 would then be checked to determine if the GEB (global enable bit) is set. Since it is, the page number (bits 0-6) would be output to the system memory control logic to address the appropriate byte in EMS base memory.

Once the proper control register has accessed the required page memory with the correct address within its range and the signals have been validated, the page memory in question becomes a window to the corresponding memory section of the resident random access memory (RAM). The maximum number of pages per board is one hundred twenty eight (128) pages, with each memory page of 16K byte. This provides a total expanded memory potential of two Mega bytes on one board. Each board (BRD0 or BRD1) uses memory access range 0D0000H through 0DFFFFH as its frame area.

The third MB of system ram is optional in the machine in which this design is used. This is the reason that the EMS control state machine always checks the seventh bit (i.e., bit 6) in BRD1's control registers. If the bit is set, the optional third MB of system RAM must be installed, since the page address must be at least 64. Recall that each page in EMS base memory is 16KB, thus the 64th page would be the first 16KB of the second MByte of the EMS base memory for BRD1. The second MByte of EMS base memory for BRD1 so happens to be the third MByte of the system RAM. So, if bit six in any BRD1 control register is set, the optional third MByte of system RAM must be present for the access to be a valid EMS access to that board.

The following Table 3 documents the memory address range as decoded for use by EMS base memory for BRD0.

TABLE III

| Address Range | Pace Number | Page Size |
|---|---|---|
| 0A0000-0A3FFFF | 0 | 16 KB |
| 0A4000-0A7FFFF | 1 | 16 KB |
| 0A8000-0ABFFFF | 2 | 16 KB |
| 0AC000-0AFFFFF | 3 | 16 KB |
| 0B0000-0B3FFFF | 4 | 16 KB |
| 0B0000-0B7FFFF | 5 | 16 KB |
| 0B0000-0BBFFFF | 6 | 16 KB |
| 0B0000-0BFFFFF | 7 | 16 KB |
| 0C0000-0C3FFFF | 8 | 16 KB |
| 0C0000-0C7FFFF | 9 | 16 KB |
| 0C0000-0CBFFFF | 10 | 16 KB |
| 0C0000-0CFFFFF | 11 | 16 KB |
| 0D0000-0D3FFFF | 12 | 16 KB |
| 0D0000-0D7FFFF | 13 | 16 KB |
| 0D0000-0DBFFFF | 14 | 16 KB |
| 0D0000-0DFFFFF | 15 | 16 KB |
| | TOTAL: | 256 KB |

The second board (BRD1) has access to the full one hundred twenty eight (128) pages when enabled. BRD1 uses address range 10000H through 2FFFFFH as its base memory. However, regardless of the number of EMS boards utilized in a particular implementation, the present invention concerns the control, selection and input/output accessing of expanded memory through the use of the expanded memory control system 10 of FIG. 1.

This control, selection and accessing of the expanded memory relies upon the implementation of the logic state machine within the PAL 12. That logic state machine provides a switching capability for selection of the proper control register set for the proper board and the individual control register that coincides with the 16K byte memory within the range of that section of memory, thereby allowing access through the memory window to the resident EMS memory.

Figure 2:
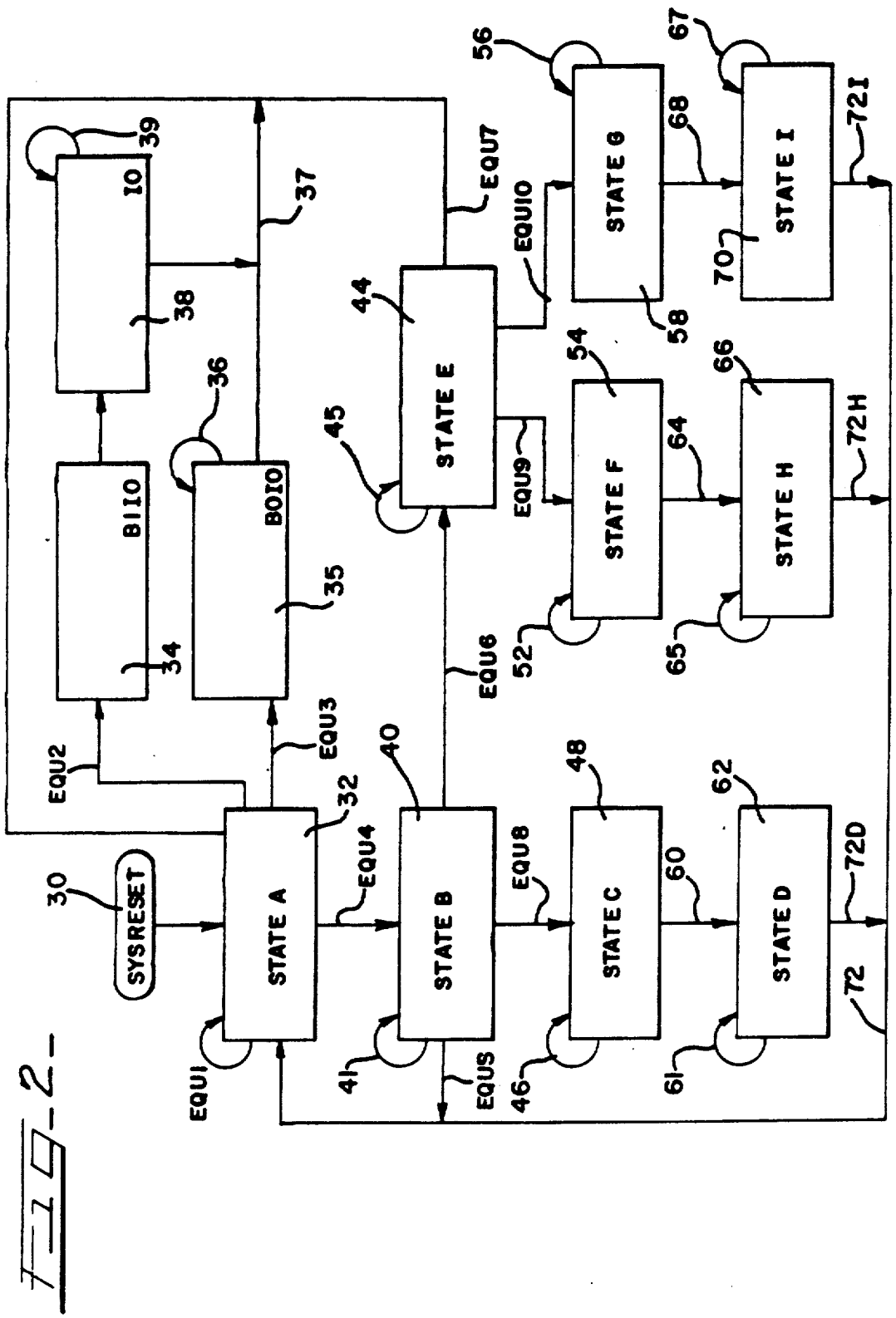
FIG. 2 comprises a flow chart representation of the sequence of events related to the state machine utilized in the extended memory control circuitry in FIG. 1.

Referring now to FIG. 2, therein is shown a flow chart representation of a sequence of events corresponding to the appropriate states of a logic state machine in accordance with the present invention. For purposes of clarity, the following computer language symbols are defined:

"!" symbol indicates an active logic low condition
"#" symbol indicates an OR logic condition
"&" symbol indicates an AND logic condition And, if no symbol precedes a signal, it is presumed to be an active logic high signal.

The operation of the logic state machine as shown in FIG. 2 may be characterized as follows. The accompanying Table IV sets forth a signal definition for the various signals given in shorthand notation on Figure 2 or described in the text below.

TABLE IV
SIGNAL DEFINITION

| | |
|---|---|
| "pclk" = 12 MHZ clock | "emsok" = EMS memory accesses valid |
| "emsmem" = EMS memory access | "valid" = "emsa20 & emsa19 & emsa18" |
| "ems/sys" = EMS for upper 256 KB | "4sa" = system address bit 4 |
| "emsio" = EMS i/o access | "ready" = ready enable to CPU |
| "sysreset" = system reset | "iow" = i/o write command |
| "emsa20" = EMS addresses from SRAM (control register bit 6) | "ior" = i/o read command |
| "emsa19" = EMS addresses from SRAM (control register bit 5) | "expen" = expansion RAM enable (signifies 3rd MB installation) |
| "emsa18" = EMS addresses from SRAM (control register bit 4) | "emsen" = EMS slot enable (control register bit 7) |

At a block 30, the system looks for a signal SYSRESET. This signal is issued by the CPU when external power is applied to the computer and accomplishes a reset function. The system then advances to a state A as shown at a block 32. As shown at the loop denoted as EQU1, when the signal !PCLK #!EMSOK #!EMSMEM #!EMSIO is recognized while the state machine is in state A, the state machine activates but does not change state, because these signals are active low. This is referred to as an idle state.

As shown in Table IV, the signal "PCLK" represents a 12 MHZ clock for timing the EMS states. The 12 MHZ clock may be derived from the 24 MHZ clock used for sequencing the CPU timing states. The signal "!EMSOK" is the EMS memory access validation (active low). The signal "!EMSMEM" is the EMS memory access signal (also active low). The signal "!EMSIO" is the EMS input/output access signal (active low), which, when active, allows the CPU to access the control registers in the SRAM via the octal buffer by the use of a software I/O command.

Referring again to the block 32 in FIG. 2, at state A, the state machine looks for additional signals. Upon recognition of the condition EMSIO &!SA4, denoted as EQU2 in FIG. 2, the state machine advances to a state B1 IO as shown at the block 34. This condition indicates that an I/O access to the control registers of BRD1 is starting. If the signals EMSIO & SA4 is recognized, as denoted by EQU3, the state machine advances to a state B0IO as shown at a block 35. This condition indicates that an I/O access to the control registers of BRD0 is occurring.

When the state machine is in the sate B0IO at the block 35, it remains in that state as long as the signal EMSI0 is recognized as shown by a loop 36. Recognition of the signal !EMSIO causes the state machine to return to state A at block 32 as shown by a line 37.

When the state machine is in state B1IO, it advances to a further (non-intermediate) state IO at a block 38. Again, recognition of the signal EMSIO, denoted by loop 39 keeps the state machine in the IO state at the block 38, while recognition of the signal !EMSIO causes the state machine to return to state A of block 32 as shown at a line 37.

The condition at line 37 indicates that the BRD1 and the BRD0 I/O programming is completed, and hence, the state machine returns to the state A for further instructions. That is, the input/output read or write command has been executed, after which the system returns to state A when the EMSIO signal goes low. Once either of the above paths of the state machine has been traversed, the signal EMSOK is set active within the PAL 12.

Referring again to the logic state A shown at block 32, the system looks for the signals EMSMEN & PCLK & EMSOK, as denoted by EQU4. When these signals are recognized the state machine advances, to a state B shown generally as a block 40 in FIG. 2. In this embodiment, the signal "EMSMEM" represents the state machine propagation. The signal "EMSOK" represents a validation signal for the EMS memory access and is used to confirm an EMS request.

At the state B shown as a block 40 in FIG. 2, the system looks for the signal !EMSEN & EMS/SYS & PCLK #EMSEN & !VALID & PCLK, as denoted by EQU5. Upon recognition of this condition, the state machine propagates from the state B to the state A. This command string function checks the 8th bit position. If the 8th bit is not active and EMS BRD1 does not exist, as indicated by EMS/SYS signal being inactive, the result is an invalid request and the system returns to the state A for the next instruction. Thus, this instruction allows for the option of adding an additional memory board to the system. This signal "EMSEN" is the 8th bit of the selected control register and the signal "EMS/SYS" is the EMS or system signal for the 2nd and 3rd MBytes of system RAM. The signal "!VALID" is a combination signal from all three EMS address lines from the SRAM 14 (also labelled as EMSA 20, EMSA 19 and EMSA 18) and is used to ensure that the page number in the control register is not above the allowed maximum of fifteen for board 0. As shown at a loop 41, the state machine state at state B when the !PCLK signal is present.

Referring again to state B shown as a block 40 in FIG. 2, the state machine advances to a state E at a block 44 if the signal combination !EMSEN & EMS/SYS & PCLK is recognized, as denoted by EQU6. This signal configuration indicates that the address requested resides on BRD1 and transfers to the state E for a different control register assigned to that address range.

Referring now to state E shown at the block 44, the state machine awaits the signal combination !EMSEN & PCLK # EMSEN & EMSA20 & PCLK & !EXPEN, as denoted by EQU7. When this signal combination is recognized, the state machine proceeds as shown to the state A at the block 32. This signal instruction checks the requested address to verify that the address location on BRD1 exists (i.e., if it is in the 3rd MB, then the 3rd MB must be present in the machine). If it does not, the state machine returns to the state A. The signal "EMSA20" is one of the EMS addresses from the SRAM 14. The signal "!EXPEN" is the expansion RAM enable signal. The !PCLK signal keeps the state machine at state E as shown by a loop 45.

Referring again to conditions indicated at state B at the block 40, in the presence of the signal combination EMSEN & VALID & PCLK, denoted by EQU8, the state machine advances as shown to a state C shown at a block 48. This command string indicates that the address resides at BRD0 (i.e.. this is a valid BRD0 EMS access) and accomplishes a transfer to state C to await the signal "PCLK". As long as the !PCLK signal is present, the state machine stages in the state C, as shown by a loop 46.

Referring once again to state E shown at the block 44, the state machine will advance as shown to a state F shown at a block 54 when the signal combination EMSEN & !EMSA20 & PCLK, denoted by EQU9, is recognized. In contrast, the state machine will advance as shown to a state G shown at a block 58 when the signal combination EMSEN & EMSA20 & PCLK & EXPEN, denoted by EQU10, is recognized. These signal instructions determine if the valid address belongs to the upper or lower address range (i.e., the 2nd or 3rd MB of system RAM) and selects state F or state G for the appropriate EMS bank select combination for that address range. As long as the !PCLK signal is present, the state machine will remain in whichever of the states F or G, that it is in as shown by loops 52 and 56.

In state C, state F or state G, the presence of the signal "PCLK" causes the state machine to advance to state D, state H, and state I, respectively. This is shown for state C as an arrow 60 indicating an advance to state D shown at a block 62. For state F, this is shown as an arrow 64 indicating an advance to a state H at a block 66. For state G, this is shown as an arrow 68 indicating an advance to a state I at a block 70. Address accessing occurs during this transfer stage. In state D, state H or state I, the presence of the signal "READY" causes a transfer to the state A as shown as a line 72 and arrows 72D, 72H and 72I, respectively. This indicates that the state machine is now ready to begin another EMS memory or I/O cycle. As long as the !READY signal is recognized, as shown by loops 61, 65 and 67, the state machine remains in whichever of the states D, Ha nd I that it is in currently.

Figure 3:
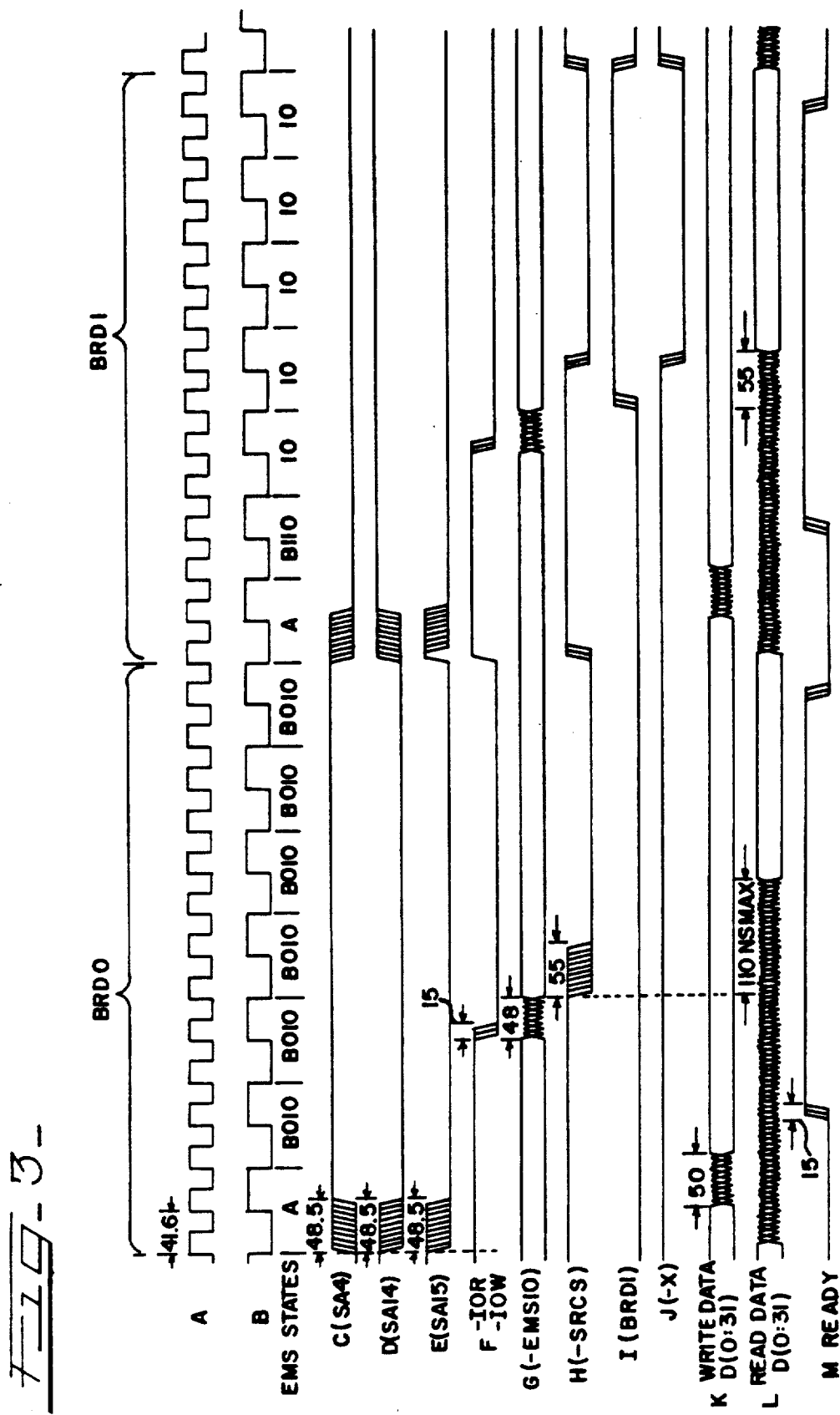
FIG. 3 illustrates the timing associated with expanded memory input/output according to at least one embodiment of the present invention.

The system that contains the EMS control logic programs it via I/O instructions. The I/O timing diagram of FIG. 3 shows typical I/O instructions to both BRD0 and BRD1 control logic. The timing diagram is split horizontally into two sections, the left half illustrating an I/O access to BRD0 and the right half illustrating an access to BRD1 control registers.

The top two signals are the clocks to the PAL 12. Waveform A is the 24 MHz clock which actually clocks the flip/flops within the PALs. Waveform B is PCLK, the 12 MHz clock, which synchronizes the EMSMEM input as well as double the duration of the states. The different states passed through during the indicated cycles are depicted just below the PCLK signal of waveform B.

Waveforms C, D and E, SA4, SA14, and SA15, respectively, are all system address lines which are generated at the cpu and sent through an octal latch. This creates a 48.5 ns delay on the signals as shown. Waveform C, SA4, is used inside the EMS control PAL to determine which board is being accessed during I/O accesses. If SA4 is high, the I/O access is to board 0 (BRD0), otherwise the access is to board 1 (BRD1). Waveforms D and E, SA14 and SA15, are the register select lines and are used as address inputs on the static RAM (SRAM) 14 to select the appropriate EMS control register.

Waveform F, −IOR/−IOW, are the active-low I/O read and write commands, respectively, from the CPU. They are used to control whether the static RAM is being read or written. Waveform G, the −EMSIO signal represents a combination of the decode of the control register address and the command signal. As shown, waveform G never goes active before the −IOR/−IOW signal of waveform F in the timing diagram.

The EMS control state machine generates the chip select for the static RAM. Waveform H, −SRCS, represents that signal, which is used for output enabling the RAM for a read operation, and selecting the chip for a write operation.

Waveform I, the BRD1 signal, is an output from the EMS control state machine which is used to select between the control register set of board 0 and board 1. On an I/O access to the registers, the state of this signal is dependent on the SA4 input to the PAL. On an EMS memory access, this signal will first be set low to check board 0 to determine if it is enabled (global enable bit set in the selected registers). If board 0 is not active, then BRD1 will be set high to allow access to board 1 registers.

Waveform J, −X, merely represents a state bit used to allow the creation of unambiguous states.

Waveforms K and L, The Write and Read data signals, show the timing of the data the CPU would write or read during that cycle.

Finally, Waveform M, the −READY signal, is generated by another control circuit and is sent to the CPU to tell it when to terminate its current bus cycle. It is used as an input here to indicate when the current bus cycle is complete so that the EMS control state machine can return to its standby state. Data to be read by the CPU must be set up prior to this signal going active.

Whenever a memory access occurs within the EMS frame memory address (D0000–DFFFF), the EMS control logic must be activated to first determine if the access is to the internal EMS memory (as opposed to an external expansion board) and then select the appropriate board's register which will output the correct page number to the memory control logic. FIG. 4 illustrates the timing diagrams associated with this operation.

The top two signals of FIG. 4 are the clocks to the PAL. Waveform A is the 24 MHz clock which actually clocks the flip/flops within the PAL. Waveform B, PCLK, the 12 MHz clock, is used to synchronize the EMSMEM input as well as double the duration of the states. The different states passed through during the indicated cycles are depicted just below the PCLK signal of waveform B.

Waveforms C and D, SA14 and SA15, are system address lines which are generated at the cpu and sent through an octal latch. This creates a 48.5 ns delay on the signals. They are used as address inputs on the static RAM (SRAM) 14 to select the appropriate EMS control register.

Waveform E, the −EMSMEM signal, is the output of the CPU address decoder which indicates if a memory access has occurred in frame memory. This signal starts the operation of the EMS control state machine.

Waveform F, −SROE, is a combination output from the PAL which enables the page number from the control register onto the EMS address bus to the memory control logic. Waveform G, −SRCS, is a state bit which is immediately turned on at the start of an EMS memory access. It is used to select the static RAM (SRAM)

Waveform H, EMSA<18...20>, are bits 4, 5 and 6 of the selected control register for the board selected by the BRD1 line. They are used to determine if a memory access to board 0 is valid. The system looks to whether any of these bits are set high. If even one bit is high, a legal access to board 0 cannot occur, because the page number is greater than fifteen (15), and only sixteen pages (0 to 15) are available on board 0. If any of these bits are found to be high, the state machine returns to state A to await another access request.

Waveform I, EMSEN, is bit seven in the selected control register. It is used to determine if the board being checked by the state machine is the board to use for this memory access. If software has programmed this bit high, using an I/O instruction, then that board is valid, and the page number is output to the memory logic.

Waveform J, BRD1, is an output from the EMS control state machine which is used to select between the control register set of board 0 and board 1. On an I/O access to the registers, the state of this signal is dependent on the SA4 input to the PAL. On an EMS memory access, this signal will first be set low to check board 0 to determine if it is enabled (global enable bit set in the selected registers). If board 0 is not active, then BRD1 will be set high to allow access to board 1 registers.

Waveforms K and L, −EMSBNK0 and −EMSBNK1, (EMS bank selects) are outputs from the state machine which indicate to the memory control logic which megabyte of EMS base RAM is being accessed. The following table describes the operation of the bank selects:

| EMSBNK1 | EMSBNK0 | MB of RAM Selected |
|---|---|---|
| 1 | 1 | none |
| 1 | 0 | first |
| 0 | 1 | second |
| 0 | 0 | third (must be installed) |

For the third megabyte bank to be selected, the EXPEN input to the PAL must be active. This indicates that the third megabyte is indeed installed in the system.

Waveform M, −X, represents a state bit used to allow the creation of unambiguous states.

Waveforms N and O, the Write and Read data signals, show the timing of the data the CPU would write or read during that cycle.

Finally, waveform P, the −READY signal, is generated by another control circuit and is sent to the CPU to tell it when to terminate its current bus cycle. It is used as an input here to indicate when the current bus cycle is complete so that the EMS control state machine can return to its standby state. Data to be read by the cpu must be setup prior to this signal going active.

Accordingly, the above description provides an improved means and method for EMS control systems for expanded memory usage. The logic state machine of the PAL IC 12 provides a method of the present invention to select, control, and access the control register in the SRAM 14 corresponding to the 16K byte window within the 64K byte EMS frame memory which is being accessed. The SRAM 14 then places the number of the 16K byte page in the EMS base memory, which was written to the control register by an I/O command from the CPU, on the EMS address lines to the system memory control logic. The bank (or megabyte) of system RAM to apply the addresses to is controlled by the EMS BANK selects output by the PAL 12.

FIG. 5 illustrates the general concept of the present invention as described above. The EMS frame memory consists of four windows (0–3), each comprising 16K bytes of memory. However, the frame memory is not actual RAM; it merely acts as a window into base memory which is managed by the control registers.

FIG. 5 also schematically shows the control registers (0–3) with the associated eight bit "address". Bit 7 comprises the global enable bit, and the seven remaining bits (0–6) comprise the page number of the addressed EMS base memory page.

Finally, FIG. 5 schematically shows a memory map of the EMS base memory. As shown, the EMS base memory comprises one hundred twenty eight pages of memory (0–127), each having 16K bytes of actual memory space. This provides 2M byte of memory, although on board 0 only 256K byte (16 pages) are available. In the illustrated example, accesses to window 0 are rerouted to page 3 of the EMS base memory. However, if the global enable bit (bit 7) was low, any access to window 0 would be ignored.

A better understanding of the operation of the present invention may be obtained from a review of the operation of the computer system in conjunction with both the timing diagrams of FIGS. 3 and 4 with the state machine representation of FIG. 2. Referring to Figure 2, state A represents an idle state for the system. During this state, the system awaits a programming input/output (I/O) instruction or an EMS access request. If an I/O access request is received, the system goes to either B1IO or B0IO depending on the condition of the 4SA bit, waveform C from FIG. 3. If 4SA is high, the system goes to B0IO and stays there for the input/output access. The SRAM is activated, and the system waits until the access cycle is complete and then returns to state A. If 4SA is low, the system goes first to state B1IO. At this state, the system must change the register addresses, because in the idle state the addresses are pointed to board 0. B1IO thus represents a simple delay state before the system advances to the IO state which operates identically as the B0IO state, except for board 1. Upon completion of the I/O access cycle, the system returns to the idle state at state A.

When an EMS access signal is recognized (EMS-MEM), the system advances from state A to state B to access SRAM and begin an EMS access cycle and determine which board portion is to be accessed. At state B the system goes through two steps. During the first step, the system checks the register on Board 0. If the enable is high, then access is desired to Board 0 and the system drives out the register bits. If valid, the system advances to state C, at which the EMS bank memory is turned on. On the next clock signal the system moves on to state D and ultimately back to the idle state at state A.

At state B, the system always checks Board 0 first. If the enable bit is low, the system moves on to state E to access Board 1. At state E, the system once again looks at the board register. Board 1 contains two megabytes of memory, and the system must determine which one megabyte bank is being accessed. To do so, the system looks at the SA20 signal (bit). If it is low, the second megabyte is being accessed, and the system advances on to state F; if it is high, the third megabyte is being accessed, and the system advances on to state G. In this fashion, state E represents a bank select operation. The remaining operation is identical to a board 0 access, once the appropriate bank of EMS memory has been identified.

The system also seeks to identify conditions indicative of other activities and illegal access. For example, if the board 0 enable bit is set, but SA18, SA19 or SA20 are high, an illegal board 0 access is indicated. Accordingly, the system goes from state B back to the idle state A. If the board 0 enable bit is low, but the board 1 enable is not activated, an external memory location is indicated and the system goes back to state A to await an The foregoing description sets forth a system which allows programming of control registers and board 0 and board 1 access. However, the described system combines the prior art functions of two separate control circuits into one circuit, thereby realizing a savings in board space and cost.

While particular embodiments of the present invention have been shown and described, it will obvious to those skilled in the art that changes and modifications may be made without departing from the invention in its broader aspects. Therefore, the appended claims should be deemed to cover all such changes and modifications as may fall within the true spirit and scope of the invention. The foregoing description and accompanying drawings are offered by way of illustration only and not as necessary limitations. The actual scope of the invention is intended to be defined in the following claims when viewed in their proper perspective in view of the relevant prior art.

What is claimed is:

1. A method for expanded memory usage comprising:
    recognizing an expanded memory access request;
    testing a first memory board enable signal;
    accessing a first memory board if said enable signal has a first state; and
    accessing a second memory board if said enable signal has a second state;
as well as:
    detecting an input/output request signal;
    testing said first memory board enable signal;
    accessing said first memory board for input/output if said first memory board enable signal has a first memory board enable signal has a second state;
further including:
    introducing a wait state prior to said second memory board input/output if said first memory board enable signal has said second state.

2. A method for expanded memory usage comprising:
    recognizing an expanded memory access request;
    ascertaining whether said expanded memory access request is valid;
    returning to an idle state to await a subsequent expanded memory access request if said expanded memory access request is not valid.
    testing a first memory board enable signal;
    accessing a first memory board if said enable signal has a first state; and
    assessing a second memory board if said enable signal has a second state.

3. A method for expanded memory usage comprising:
    recognizing an expanded memory access request;
    testing a first memory board enable signal;

accessing a first memory board if said enable signal has a first state;
accessing a second memory board if said enable signal has a second state;
ascertaining whether said expanded memory access request is directed to the first or second memory boards; and p1 returning to an idle state if said expanded memory access request is not directed to said first or said second memory board.

* * * * *